US010304339B2

(12) United States Patent
Jiang et al.

(10) Patent No.: US 10,304,339 B2
(45) Date of Patent: May 28, 2019

(54) EXTENDING VEHICLE-TO-VEHICLE COMMUNICATIONS VIA SENSORS

(71) Applicant: QUALCOMM Incorporated, San Diego, CA (US)

(72) Inventors: Libin Jiang, Bridgewater, NJ (US); Shailesh Patil, Raritan, NJ (US); Georgios Tsirtsis, London (GB); Michaela Vanderveen, Tracy, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/452,596

(22) Filed: Mar. 7, 2017

(65) Prior Publication Data
US 2018/0261097 A1 Sep. 13, 2018

(51) Int. Cl.
G08G 1/16 (2006.01)
H04L 29/08 (2006.01)
G08G 1/0967 (2006.01)
G07C 5/08 (2006.01)
B60W 50/00 (2006.01)

(52) U.S. Cl.
CPC ......... G08G 1/163 (2013.01); B60W 50/0098 (2013.01); G07C 5/0816 (2013.01); G08G 1/096791 (2013.01); H04L 67/12 (2013.01); B60W 2050/0077 (2013.01)

(58) Field of Classification Search
CPC ... G08G 1/163; G08G 1/096791; H04L 67/12
See application file for complete search history.

(56) References Cited

U.S. PATENT DOCUMENTS

| 8,520,695 | B1 | 8/2013 | Rubin et al. | |
| 9,210,689 | B2 * | 12/2015 | Subramanian | H04W 72/005 |
| 2014/0092735 | A1 | 4/2014 | Lee et al. | |
| 2015/0035685 | A1 * | 2/2015 | Strickland | B60Q 9/008 340/901 |
| 2016/0086487 | A1 | 3/2016 | Abraham et al. | |
| 2017/0053530 | A1 * | 2/2017 | Gogic | H04W 4/046 |
| 2017/0337571 | A1 * | 11/2017 | Bansal | G07C 5/008 |
| 2017/0372612 | A1 * | 12/2017 | Bai | G08G 1/161 |

OTHER PUBLICATIONS

Brian Cronin, "Vehicle Based Data and Availability," United States Department of Transportation, Oct. 2012, online: https://www.its.dot.gov/itspac/october2012/PDF/data_availability.pdf.*

(Continued)

*Primary Examiner* — Nader Bolourchi
(74) *Attorney, Agent, or Firm* — Arent Fox LLP

(57) ABSTRACT

An apparatus for wireless communication is provided. The apparatus determines, through sensors of a first vehicle, second-vehicle information associated with a second vehicle. In addition, the apparatus generates at least one safety message to include the determined second-vehicle information of the second vehicle. Further, the apparatus transmits the at least one safety message. The apparatus improves the performance/benefit of V2V communications technology by transmitting BSMs for other vehicles, including non-V2V vehicles without such V2V communications technology. Accordingly V2V vehicles will be able to better assess the traffic situation.

28 Claims, 10 Drawing Sheets

(56) References Cited

OTHER PUBLICATIONS

International Search Report and Written Opinion—PCT/US2018/016907—ISA/EPO—dated Apr. 26, 2018.
Papadimitratos P., et al., "Secure Vehicular Communication Systems: Design and Architecture", IEEE Communications Magazine, IEEE Service Center, Piscataway, US, Nov. 1, 2008, vol. 46, No. 11, pp. 100-109, XP011239041, ISSN: 0163-6804, DOI: 10.1109/MCOM.2008.4689252.

* cited by examiner

EXTENDING VEHICLE-TO-VEHICLE COMMUNICATIONS VIA SENSORS

BACKGROUND

Field

The present disclosure relates generally to communication systems, and more particularly, to extending vehicle-to-vehicle (V2V) communications via sensors.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. Another standard associated with V2V communications is 802.11p-based dedicated short-range communications (DSRC). There exists a need for further improvements in 5G NR, 4G LTE, DSRC, and other technologies and the standards employing such technologies in relation to V2V communications technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first vehicle. The first vehicle determines, through sensors of the first vehicle, second-vehicle information associated with a second vehicle. In addition, the first vehicle generates at least one safety message to include the determined second-vehicle information of the second vehicle. Further, the first vehicle transmits the at least one safety message. The apparatus improves the performance/benefit of V2V communications technology by transmitting basic safety messages (BSMs) for other vehicles, including non-V2V vehicles without such V2V communications technology. Accordingly V2V vehicles will be able to better assess the traffic situation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
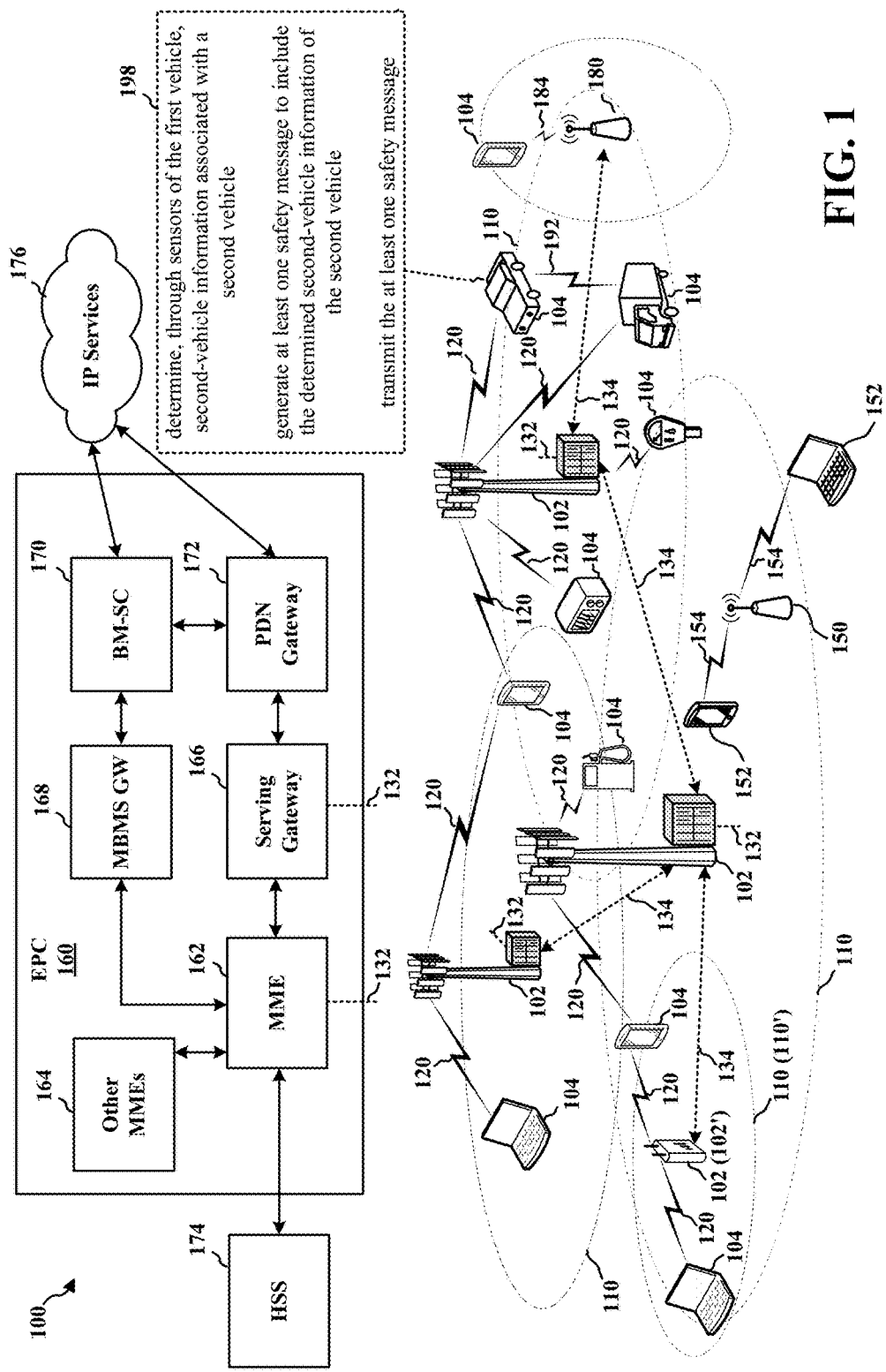
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a first vehicle/UE 104 (e.g., the depicted car) may determine, through sensors of the first vehicle/UE 104, second-vehicle information associated with a second vehicle/UE 104 (e.g., the depicted truck). In addition, the first vehicle/UE 104 may generate at least one safety message to include the determined second-vehicle information of the second vehicle/UE 104. Further, the first vehicle/UE 104 may transmit the at least one safety message (198).

Figures 2A, 2B, 2C, 2D:
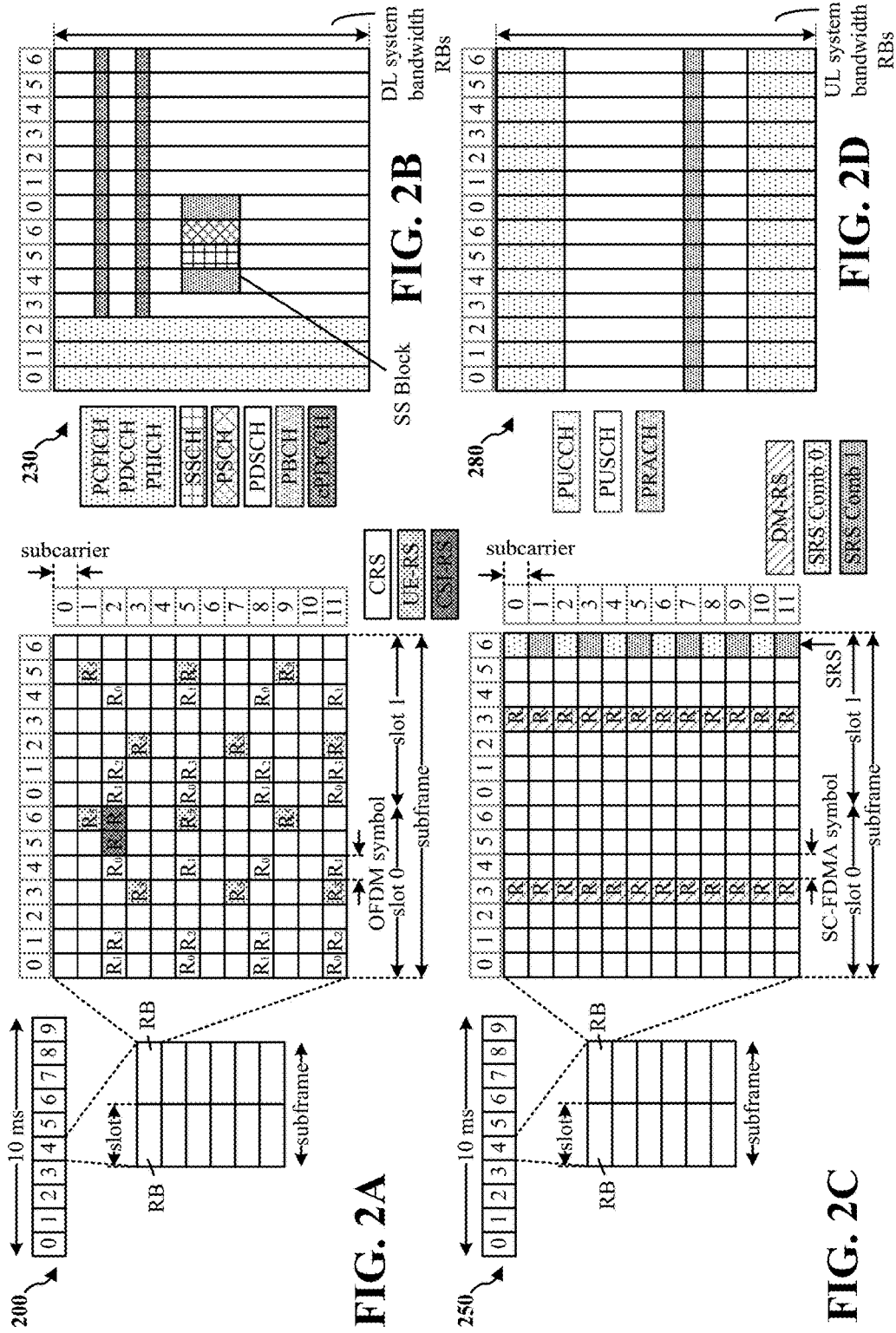
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
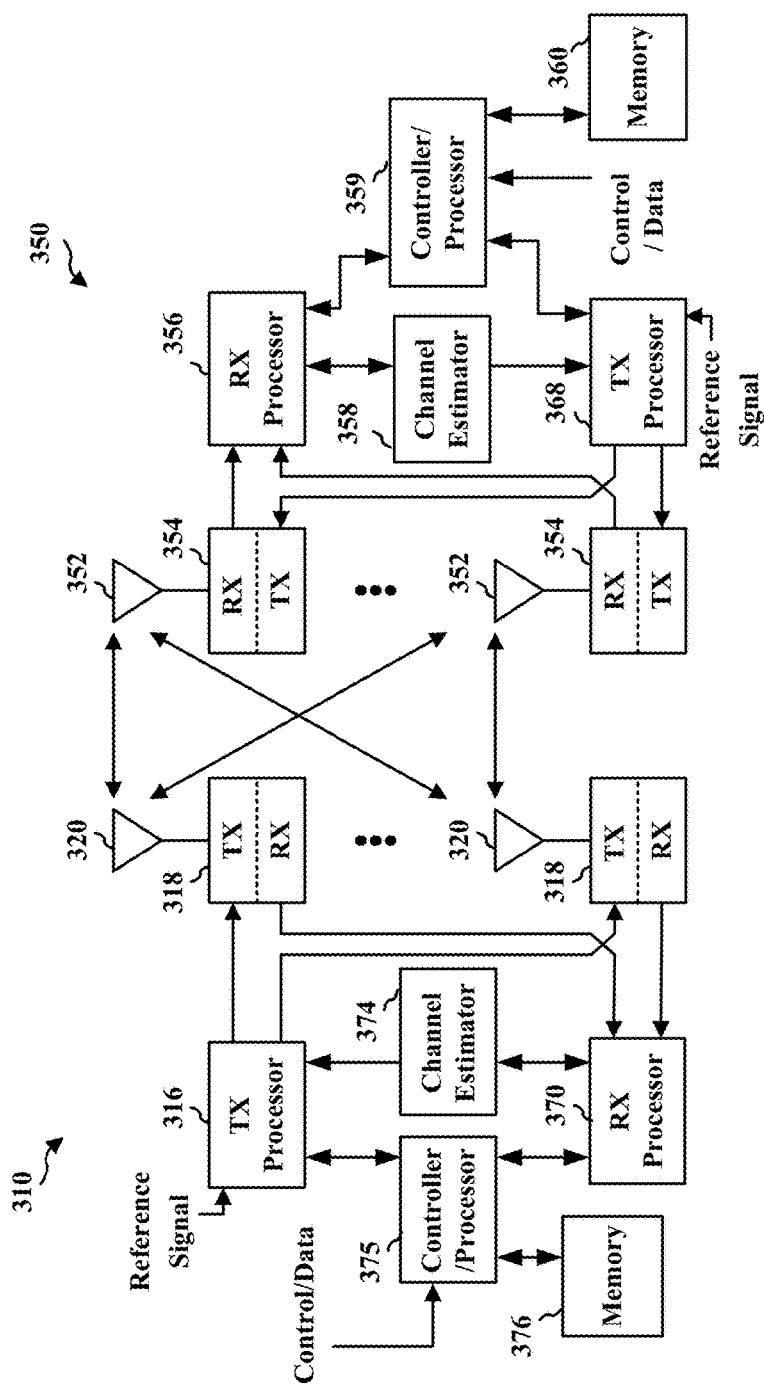
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
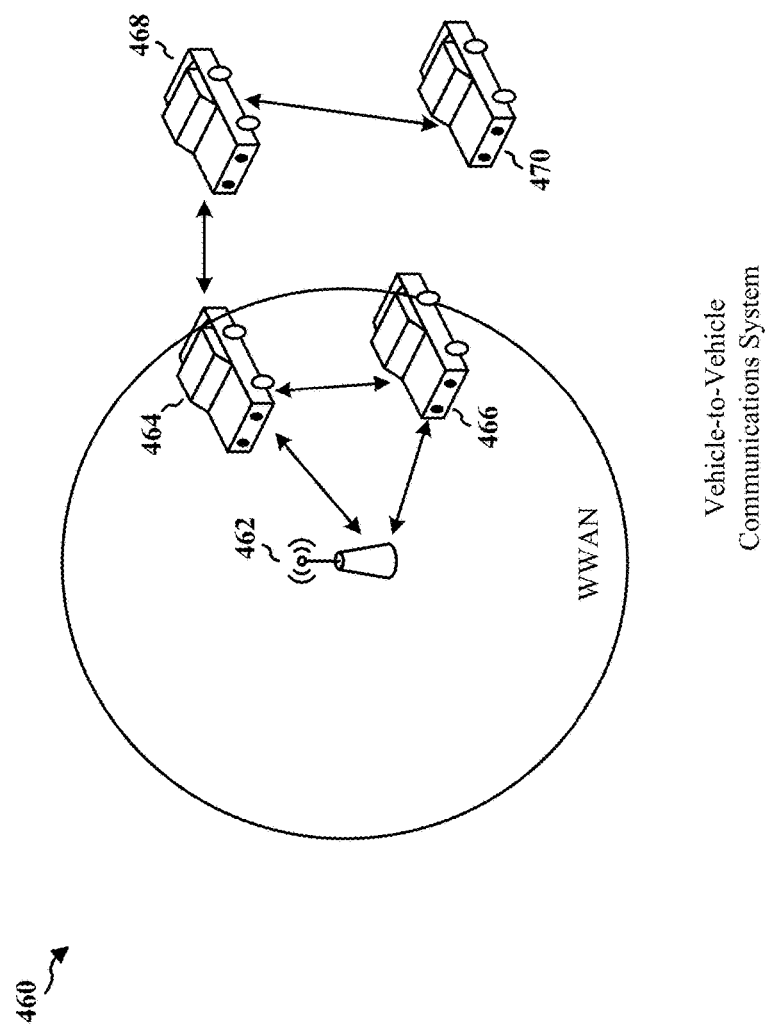
FIG. 4 is a diagram of a V2V communications system.

FIG. 4 is a diagram of a V2V (also referred to as a device-to-device (D2D)) communications system 460. The V2V communications system 460 includes a plurality of vehicles (also referred to as UEs) 464, 466, 468, 470. The V2V communications system 460 may overlap with a cellular communications system, such as for example, a WWAN. Some of the vehicles 464, 466, 468, 470 may communicate together in V2V communication using the DL/UL WWAN spectrum, some may communicate with the base station 462, and some may do both. For example, as shown in FIG. 4, the vehicles 468, 470 are in V2V communication and the vehicles 464, 466 are in V2V communication. The vehicles 464, 466 are also communicating with the base station 462. The V2V communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless V2V communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless V2V communication systems.

In V2V communications, a vehicle may broadcast basic safety messages (BSMs) that include information associated with the vehicle, such as for example, position, speed, heading, etc., such that other vehicles know their surrounding traffic. As the V2V communications market takes off, there will be a gradually increasing number of vehicles equipped with the V2V communications technology. Therefore, in the early stages of deployment of the V2V communications technology, the benefit of the V2V communications technology will be limited due to a relatively low penetration of the V2V communications technology. Accordingly, there is currently a need to increase the benefit/performance of the V2V communications technology, especially when there is a relatively small number of vehicles equipped with such V2V communications technology.

More and more vehicles are being equipped with sensors (such as camera, light detection and ranging (LIDAR), radar, etc.) to enable driver assistance systems or autonomous driving. Using these sensors, a vehicle can track the relative positions of nearby vehicles within a line of sight of the vehicle. With limited deployment of V2V communications technologies, a vehicle without the V2V communications technology (referred to herein as a "non-V2V vehicle") cannot broadcast its BSM. However, if this vehicle is "seen" by a vehicle with the V2V communications technology (referred to herein as a "V2V vehicle") via its sensors, the V2V vehicle can potentially broadcast a BSM on behalf of the non-V2V vehicle (this may be called a "proxy BSM"). Providing proxy BSMs on behalf of non-V2V vehicles can greatly increase the benefit/performance of the V2V communications technology.

Figure 5:
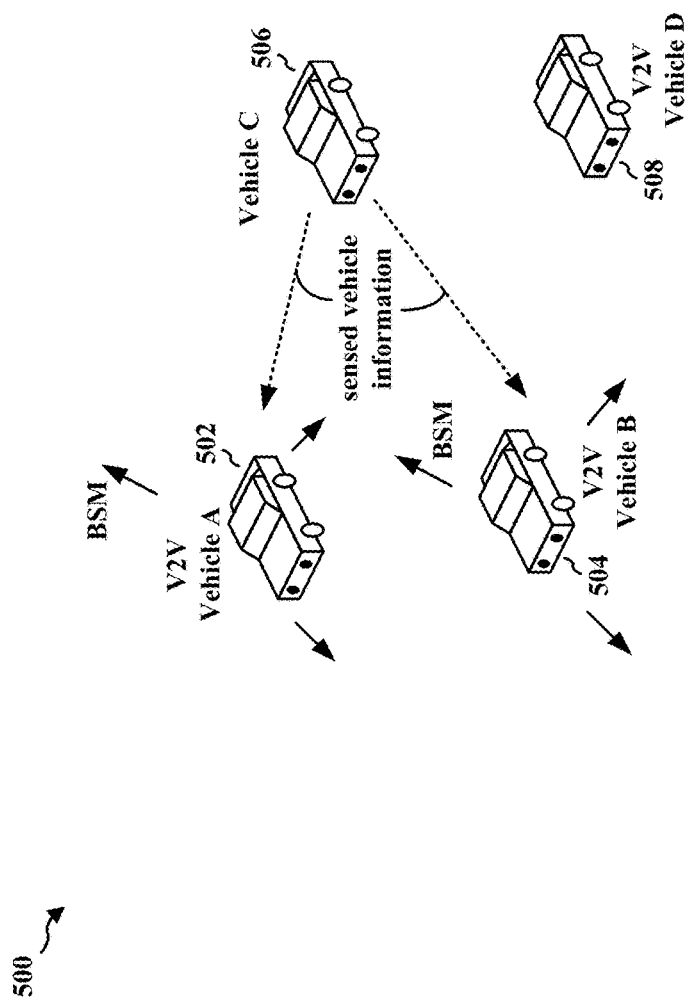
FIG. 5 is a first diagram illustrating exemplary V2V communication in association with basic safety messages.

FIG. 5 is a first diagram 500 illustrating exemplary V2V communication in association with BSMs. As discussed supra, providing proxy BSMs on behalf of non-V2V vehicles can greatly increase the benefit/performance of the V2V communications technology. However, multiple V2V vehicles A 502, B 504 could transmit BSMs on behalf of the same vehicle C 506 if the vehicles A 502, B 504 both track the vehicle C 506. Both of the vehicles A 502, B 504 transmitting BSMs on behalf of the same vehicle C 506 may be unnecessary if vehicle A 502 and vehicle B 504 are very close. If they are far apart, there is some value of transmitting the same BSM because the message can reach a larger range. Therefore, if vehicle B 504 receives a BSM from vehicle A 502 about vehicle C 506 that matches its own measurement for the vehicle C 506 and if vehicle B 504 and vehicle A 502 are close, then in one configuration, vehicle B 504 does not transmit a BSM on behalf of the matched vehicle C 506.

V2V vehicles (e.g., vehicles A 502, B 504) are equipped with sensors that track the relative positions, speeds, and headings of nearby vehicles. By combining the information with its own absolute position, speed, heading (e.g., obtained from a global positioning system (GPS)), a V2V vehicle can derive the absolute position, speed, and heading of each tracked vehicle.

A V2V vehicle equipped with sensors may broadcast its own BSM and the BSMs of other vehicles tracked by its sensors. The BSMs of other vehicles may include the absolute positions, speeds, and headings of other vehicles. The BSMs of other vehicles may include positions, speeds, and headings of other vehicles relative to the V2V vehicle. In this case the BSM size may be greatly reduced. In the BSMs, a V2V vehicle may assign an arbitrary identifier (ID) to each tracked vehicle. Note that a tracked vehicle may or may not be equipped with V2V communications technology.

If V2V vehicle B 504 receives a BSM from vehicle A 502 about vehicle C 506 that matches its own measurement, and if the distance between vehicle B 504 and vehicle A 502 is less than a threshold (e.g., 10 m), then in one configuration, vehicle B 504 does not transmit the BSM of the matched vehicle C 506. Refraining from transmitting BSMs of matched vehicles may be done to avoid redundant transmissions.

A V2V vehicle that receives BSMs from at least one other V2V vehicle may combine the information contained in the BSMs to know its surrounding traffic.

If the channel conditions or the internal vehicle logic/configuration for vehicle B 504 are such that it is possible/desirable to transmit a BSM on behalf of vehicle C 506 even if vehicle A 502 is also transmitting (e.g., when the communications channel congestion is less than a communications channel congestion threshold), the advantage is that a fourth V2V-enabled vehicle D 508 can hear both BSMs proxied for vehicle C 506 and thus combine and arrive at more accurate and more trustworthy data about vehicle C 506.

Furthermore, when vehicles A 502, B 504 are close and both can sense vehicle C 506, in one configuration, vehicle A 502 may transmit proxy BSMs on behalf of vehicle C 506 with a given time frequency/periodicity, while vehicle B 504 may only transmit the proxy BSMs on behalf of vehicle C 506 more rarely or not at all, depending on channel loading. This is a tradeoff in channel resource use versus accuracy/trustworthiness of proxy BSMs from the point of view of other vehicles who cannot sense C.

Security Aspects

BSMs may be sent with a security component to them, which is in two parts, a "signer" part and a "signature" part. These are digital certificate signatures, one for each BSM. The security component of the BSM may be large compared to the actual data sent. Therefore, it may be beneficial to piggyback one or more proxy BSMs onto the same V2V message sharing the same security component. Under normal operation, vehicle A 502 sends BSMs with its own position, timestamp, velocity, etc., and signs them with its temporary digital certificate. When sending one or more proxy BSM(s) as well, a vehicle has two options. In a first option, a vehicle may send each proxy BSM as a separate V2V message, independent of its own BSM, and signed with a different certificate. This has the advantage of privacy for the sending vehicle, as its proximity to the proxied vehicle C 506 is not revealed, as other vehicles who hear these two BSMs, the real BSM and the proxy BSM, cannot determine whether they are transmitted by the same vehicle A 502. However the disadvantage is that the security component has to be sent too with the proxy BSM, increasing the channel usage. Also, the sending vehicle has to use up two or more of its certificates to sign these two or more BSMs, thus using up its stored certificates more quickly. In a second option, a vehicle may send its own BSM and the proxied BSM(s) together in one V2V message signed with the same certificate. A slight privacy loss occurs but the security overhead is reduced because only one signature is required for two or more BSMs.

Figure 6:
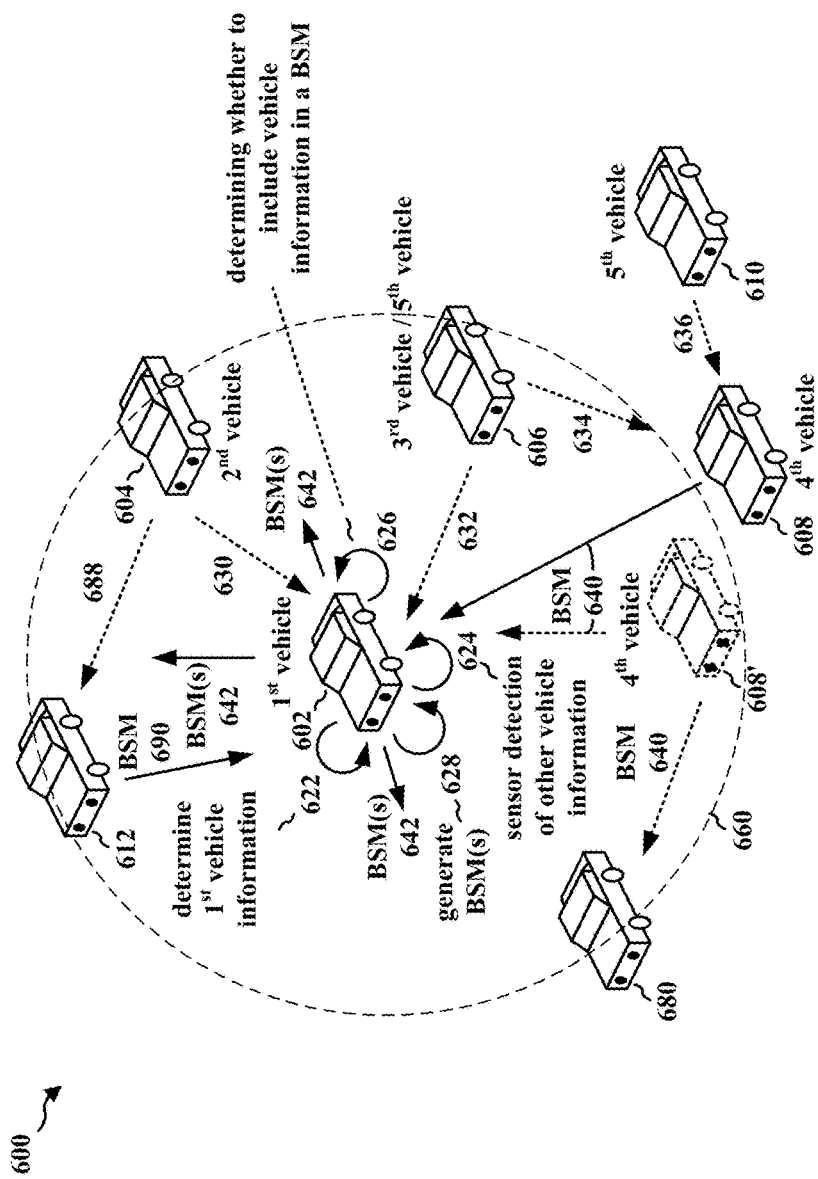
FIG. 6 is a second diagram illustrating exemplary V2V communication in association with basic safety messages.

FIG. 6 is a second diagram 600 illustrating exemplary V2V communication in association with BSMs. As illustrated in FIG. 6, a first vehicle 602 may determine 624, through sensors (e.g., camera, LIDAR, radar, etc.) of the first vehicle 602, second-vehicle information 630 associated with a second vehicle 604. The second-vehicle information 630 may include at least one of a position (e.g., latitude, longitude, elevation), a velocity (also referred to as a "speed"), an acceleration, a heading, a brake status, a vehicle size, a path history, a path prediction, or exterior light states (e.g., vehicle light status, including turn signals) of the second vehicle 604. The path history includes information of the vehicle's recent movements, and indicates a sequence of positions that represent the vehicle's position within an allowable error. The path prediction provides an estimate of the vehicle's future trajectory. The trajectory may be represented as a radius of curvature. Subsequently, the first vehicle 602 may generate 628 at least one BSM to include the determined second-vehicle information 630 of the second vehicle 604. After generating 628 the BSM(s), the first vehicle 602 may transmit the BSM(s) 642 so that other V2V vehicles (e.g., vehicle 612) have the second-vehicle information 630 associated with the second vehicle 604.

The first vehicle 602 may also determine 622 first-vehicle information associated with the first vehicle 602. The first-vehicle information may include at least one of a position, a velocity, an acceleration, a heading, a brake status, a vehicle size, at least one vehicle event flag, a path history, a path prediction, a steering-wheel angle, a timestamp, a positional accuracy, a transmission state, an identifier of the first vehicle, or exterior light states of the first vehicle. The vehicle event flag conveys a status with respect to safety-related events such as antilock-brake system activation, stability control activation, hard braking, and airbag deployment. The first vehicle 602 may include the first-vehicle information in the transmitted BSM(s) 642.

As discussed supra, the first vehicle 602 may transmit BSM(s) 642 including first-vehicle information of the first vehicle (a V2V vehicle) 602 and including second-vehicle information 630 of the second vehicle 604. The second vehicle 604 may be a non-V2V vehicle or a V2V vehicle. Accordingly, vehicles such as the vehicle 612 may be able to obtain BSM-related information for both V2V vehicles and non-V2V vehicles (assuming the second vehicle 604 is a non-V2V vehicle), which greatly improves the benefit/performance of the V2V communications technology, as the vehicle 612 will have a better assessment of the surrounding traffic.

Multiple V2V vehicles may end up transmitting BSMs on behalf of the same vehicle. For example, if vehicle 604 is in the line of sight of the vehicle 612, both the vehicle 602 and the vehicle 612 may transmit proxy BSMs for the vehicle 604. Multiple transmissions of the same information in BSMs may be unnecessary or redundant if the vehicles are close to each other. For example, if the vehicles 602, 612 are close to each other, each transmitting a proxy BSM on behalf of the vehicle 604 may be unnecessary, as vehicles in range of one of the vehicles 602, 612 will likely be in range of the other of the vehicles 612, 602, respectively. However, if the vehicles 602, 612 are far apart, there may be some value in transmitting the same information in BSMs, as the information can reach a larger range. Accordingly, in one configuration, the first vehicle 602 may determine 626 whether to include particular vehicle information in a BSM for transmission based on, among other factors as discussed infra, whether such vehicle information correlates with (matches) vehicle information received from a vehicle and the vehicle from which the correlated vehicle information is received is within a threshold distance 660 of the first vehicle 602. FIG. 6 demonstrates such an example.

Referring again to FIG. 6, the first vehicle 602 may determine 624, through sensors of the first vehicle, third-vehicle information 632 associated with a third vehicle 606. Similar to the second-vehicle information 630, the third-vehicle information 632 may include at least one of a position, a velocity, an acceleration, a heading, a brake status, a vehicle size, a path history, a path prediction, or exterior light states of the third vehicle 606. The first vehicle 602 may receive, from a fourth vehicle 608, a BSM 640 including fifth-vehicle information 634 or 636 associated with a fifth vehicle 606 or 610, respectively. The fourth vehicle 608 obtained the fifth-vehicle information 634 or 636 through its own sensors. Subsequently, the first vehicle 602 may determine whether the third vehicle 606 is the fifth vehicle 606 or 610 based on correlating the third-vehicle information 632 with the fifth-vehicle information 634 or 636. The first vehicle 602 may perform the correlation by comparing the determined position, velocity, acceleration, heading, brake status, vehicle size, path history, path prediction, and/or exterior light states of the third-vehicle information 632 to the received position, velocity, acceleration, heading, brake status, vehicle size, path history, path prediction, and/or exterior light states of the fifth-vehicle information 634 or 636. In one example, if the fifth-vehicle information includes vehicle-information 636 from the vehicle 610, the first vehicle 602 may determine that the third vehicle 606 and the fifth vehicle 610 are not the same vehicle based on the lack of correlation of the data. In another example, if the fifth-vehicle information in the BSM 640 includes vehicle-information 634 from the vehicle 606, the first vehicle 602 may determine that the third vehicle 606 and the fifth vehicle 606 are the same vehicle based on the correlation of the data.

When the first vehicle 602 determines that the third-vehicle information 632 and the fifth-vehicle information in the BSM 640 do not correlate (e.g., the fifth-vehicle information in the BSM 640 includes vehicle information 636 associated with the vehicle 610), the first vehicle 602 may determine 626 to include the third-vehicle information 632 in the transmitted BSM(s) 642. However, if the third-vehicle information 632 and the fifth-vehicle information in the BSM 640 correlate (e.g., the fifth-vehicle information in the BSM 640 includes vehicle information 634 associated with the vehicle 606), the first vehicle 602 may determine 626 whether to include the third-vehicle information 632 in the transmitted BSM(s) 642 based on one or more additional factors, including distance between the first vehicle 602 and the fourth vehicle 608 and/or whether the communication channel is congested.

In one configuration, after the first vehicle 602 determines that the third-vehicle information 632 and the fifth-vehicle information in the BSM 640 are correlated (the information is deemed to be associated with the same vehicle), the first vehicle 602 may determine a distance between the fourth vehicle 608 and the first vehicle 602. When the first vehicle 602 determines that the fourth vehicle 608 is greater than a threshold distance 660 away from the first vehicle 602, the first vehicle 602 may determine 626 to include the third-vehicle information 632 in the transmitted BSM(s) 642.

In a first configuration (see also infra flow A of FIG. 8), when the first vehicle 602 determines that the third-vehicle information 632 and the fifth-vehicle information in the BSM 640 are correlated and that the fourth vehicle 608 is less than a threshold distance 660 away from the first vehicle 602 (such as when the fourth vehicle is located at 608'), the first vehicle 602 may determine to exclude the third-vehicle information 632 from the transmitted BSM(s) 642.

In a second configuration (see also infra flow B of FIG. 8), when the first vehicle 602 determines that the third-vehicle information 632 and the fifth-vehicle information in the BSM 640 are correlated and that the fourth vehicle 608 is less than a threshold distance 660 away from the first vehicle 602 (such as when the fourth vehicle is located at 608'), the first vehicle 602 may then determine whether a communication channel congestion is greater than a communication channel congestion threshold. For example, the first vehicle 602 may determine that $R_u$ percent of the V2V communication resources (referred to herein as a communications channel congestion) are being utilized and compare the $R_u$ to a communication channel congestion threshold $R_{th1}$. If the first vehicle 602 determines that the communication channel congestion $R_u$ is less than the communication channel congestion threshold $R_{th1}$, the first vehicle 602 may determine 626 to include the third-vehicle information 632 in the transmitted BSM(s) 642. The rationale for transmitting the third-vehicle information 632 in a proxy BSM is that, as the communication channel is not too congested, the communication channel congestion may be increased so that other V2V vehicles may be able to combine proxy BSMs associated with the third vehicle 606 to get a better assessment of the position, status, or other safety-related information of the third vehicle 606. For example, as shown in FIG. 6, the vehicle 680 may receive the third-vehicle information 632 of the third vehicle 606 in the transmitted BSM(s) 642 from the first vehicle 602, and may receive the fifth-vehicle information 634 of the third vehicle 606 in the BSM 640 from the fourth vehicle 608. The third-vehicle information 632 and the fifth-vehicle information 634 may be different based on the ability of the vehicles 602, 608' to get an accurate sense through their own sensors of the position, status, or other safety related information of the third vehicle 606. The vehicle 680 may combine the received vehicle information in the BSMs 642, 640 to better assess the position, status, or other safety related information of the third vehicle 606.

In a third configuration (see also infra flow B, C of FIG. 8), when the first vehicle 602 determines that the third-vehicle information 632 and the fifth-vehicle information (in this case, 634) in the BSM 640 are correlated and that the fourth vehicle 608 is less than a threshold distance 660 away from the first vehicle 602 (such as when the fourth vehicle is located at 608'), the first vehicle 602 may then determine whether a communication channel congestion $R_u$ is greater than a communication channel congestion threshold $R_{th1}$. If the first vehicle 602 determines that the communication channel congestion $R_u$ is greater than the communication channel congestion threshold $R_{th1}$, the first vehicle 602 may determine 626 to exclude the third-vehicle information 632 from the transmitted BSM(s) 642. The rationale for excluding the third-vehicle information 632 from a proxy BSM is that, as the communication channel is already congested, increasing the communication channel congestion further may cause a greater performance/benefit loss to the V2V communications technology than what is gained through providing to V2V vehicles redundant or semi-redundant information associated with the same vehicle in multiple BSMs.

In a fourth configuration (see also infra flow B, D of FIG. 8), when the first vehicle 602 determines that the third-vehicle information 632 and the fifth-vehicle information (in this case, 634) in the BSM 640 are correlated and that the fourth vehicle 608 is less than a threshold distance 660 away from the first vehicle 602 (such as when the fourth vehicle is located at 608'), the first vehicle 602 may then determine whether a communication channel congestion $R_u$ is greater than a communication channel congestion threshold $R_{th1}$. If the first vehicle 602 determines that the communication channel congestion $R_u$ is greater than the communication channel threshold $R_{th1}$, the first vehicle 602 may then determine a periodicity for including the third-vehicle information 632 in the transmitted BSM(s) 642 and may determine 626 to include the third-vehicle information 632 in the transmitted BSM(s) 642 based on the determined periodicity. For example, the first vehicle 602 may determine to include the third-vehicle information 632 n out of m transmission opportunities of the third-vehicle information 632, where n<m. In one configuration, the variables n and m may be a function of the communication channel congestion and/or a function of both the communication channel congestion and the communication channel congestion threshold. The rationale for including the third-vehicle information 632 in a proxy BSM is that the performance/benefit loss of a modest increase in the communication channel congestion may be outweighed by what is gained through providing to V2V vehicles redundant or semi-redundant information associated with the same vehicle in multiple BSMs.

In a fifth configuration (see also infra flow B, E of FIG. 8), when the first vehicle 602 determines that the third-vehicle information 632 and the fifth-vehicle information (in this case, 634) in the BSM 640 are correlated and that the fourth vehicle 608 is less than a threshold distance 660 away from the first vehicle 602 (such as when the fourth vehicle is located at 608'), the first vehicle 602 may then determine whether a communication channel congestion $R_u$ is greater than a first communication channel congestion threshold $R_{th1}$. If the first vehicle 602 determines that the communication channel congestion $R_u$ is greater than the first communication channel congestion threshold $R_{th1}$, the first vehicle 602 may then determine whether the communication channel congestion $R_u$ is greater than a second communication channel congestion threshold $R_{th2}$, where $R_{th2}>R_{th1}$. If the first vehicle 602 determines that the communication channel congestion $R_u$ is greater than the second communication channel congestion threshold $R_{th2}$ ($R_u>R_{th2}$), the first vehicle 602 may determine 626 to exclude the third-vehicle information 632 from the transmitted BSM(s) 642. However, if the first vehicle 602 determines that the communication channel congestion $R_u$ is less than the second communication channel congestion threshold $R_{th2}$ but greater than the first communication channel congestion threshold $R_{th1}$ ($R_{th1}<R_u<R_{th2}$), the first vehicle 602 may determine 626 a periodicity for including the third-vehicle information 632 in the transmitted BSM(s) 642 and determine 626 to include the third-vehicle information 632 in the transmitted BSM(s) 642 based on the determined periodicity. The rationale for this configuration is that when the communications channel congestion is somewhat congested ($R_{th1}<R_u<R_{th2}$), the performance/benefit loss of a modest increase in the communication channel congestion by including the third-vehicle information 632 in a proxy BSM may be outweighed by what is gained through providing to V2V vehicles redundant or semi-redundant information associated with the same vehicle in multiple BSMs. However, when the communications channel congestion is overly congested ($R_u>R_{th2}$), the performance/benefit loss of a further increase in the communication channel congestion by including the third-vehicle information 632 in a proxy BSM may not be outweighed by what is gained through providing to V2V vehicles redundant or semi-redundant information associated with the same vehicle in multiple BSMs.

Referring again to FIG. 6, the first vehicle 602 may receive a BSM 690 from the vehicle 612, where the BSM 690 includes vehicle information 688 associated with the second vehicle 604 (the vehicle 612 obtained the vehicle information 688 through its sensors). The first vehicle 602 may combine the vehicle information 688 received in the BSM 690 with the second-vehicle information 630. Subsequently, the first vehicle 602 may control the first vehicle 602 based on the combined information 688, 630. For example, the first vehicle 602 may ascertain position, status, or other safety-related information of the second vehicle 604 based on the combined information 688, 630 when determining whether to autonomously brake to slow the first vehicle 602, when determining whether to warn a driver of the first vehicle 602 about the second vehicle 604, or when determining some other action.

As discussed supra, the first vehicle 602 transmits one or more BSMs that include safety-related messages. In one configuration, each BSM includes vehicle information associated with just one vehicle. In another configuration, each BSM may include vehicle information associated with more than one vehicle. When a BSM includes vehicle information associated with more than one vehicle, some of the information may be relative to the other information. For example, if the first vehicle 602 transmits one BSM including first-vehicle information (see 622) and second-vehicle information 630, the first-vehicle information may be absolute (e.g., absolute position, velocity, acceleration, heading, path history, path prediction, etc.), and the second-vehicle information 630 may be provided relative to the first-vehicle information. Providing relative information in a BSM may reduce the size of the BSM because less bits are needed to convey such information as compared to when separate BSMs are provided each with absolute vehicle information.

As discussed supra, a BSM may be transmitted with a digital certificate. As such, the first vehicle 602 may transmit the BSM 642 with a digital certificate signed by the first vehicle 602. In one configuration, the BSM 642 may include vehicle information associated with a plurality of vehicles, and the BSM 642 may be signed with one digital certificate. In another configuration, the BSM 642 may include vehicle information associated with just one vehicle, and each BSM 642 may be signed with a digital certificate. In such a configuration, the first vehicle 602 may use a first digital certificate to sign the BSM including the first-vehicle information, and a second digital certificate different than the first digital certificate to sign the BSM including the second-vehicle information 630.

Figure 7:
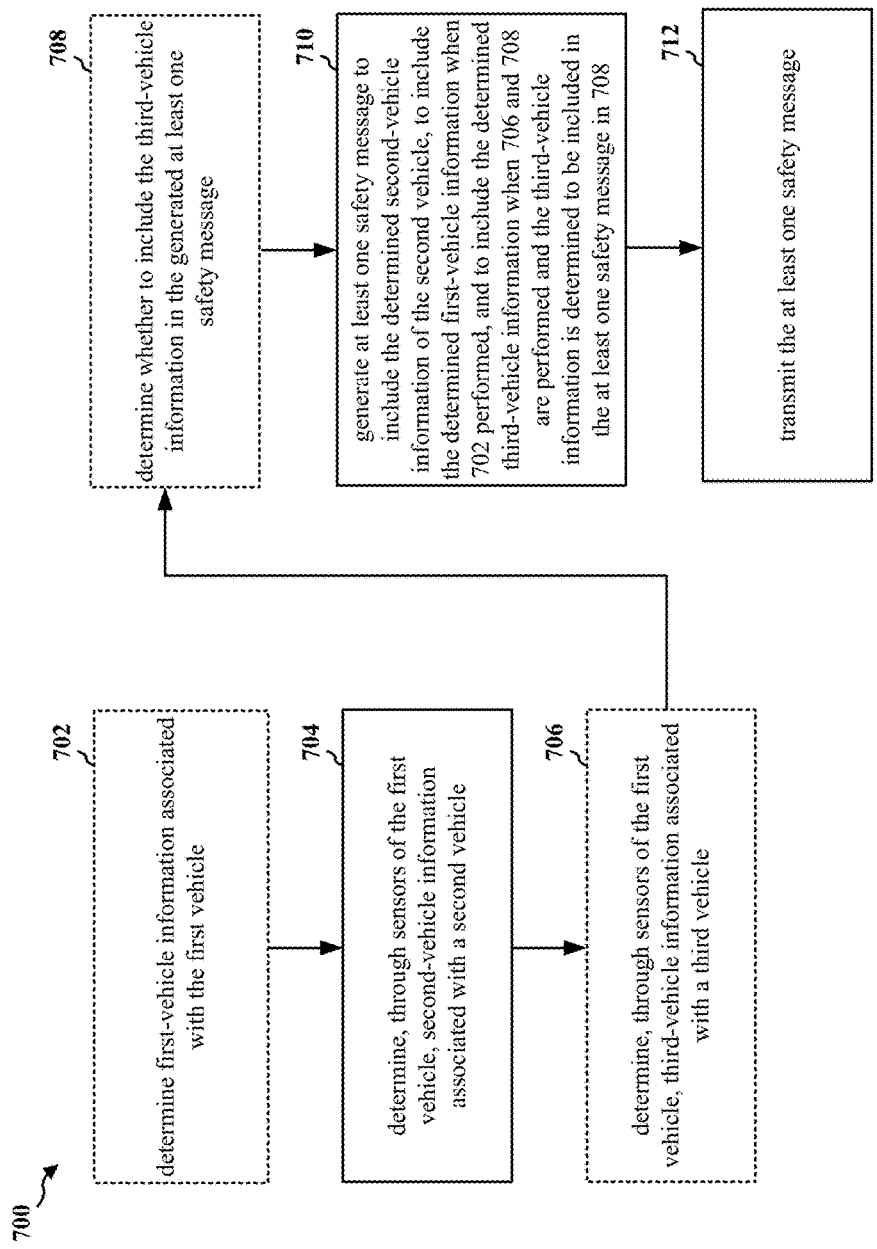
FIG. 7 is a flowchart illustrating a first set of methods of V2V wireless communication.

FIG. 7 is a flowchart 700 illustrating a first set of methods of V2V wireless communication. In FIG. 7, optional blocks are indicated by the dotted lines. At 704, a first vehicle 602 determines (624), through sensors of the first vehicle 602, second-vehicle information 630 associated with a second vehicle 604. At 710, the first vehicle 602 generates (628) at least one safety message (e.g., BSM(s)) 642 to include the determined second-vehicle information 630 of the second vehicle 604. At 712, the first vehicle 602 transmits (e.g., broadcasts) the at least one safety message 642.

As discussed supra, the second-vehicle information 630 may include at least one of a position, a velocity, an acceleration, a heading, a brake status, a vehicle size, a path history, a path prediction, or exterior light states of the second vehicle 604.

In one configuration, at 702, the first vehicle 602 may determine (622) first-vehicle information associated with the first vehicle 602 including at least one of a position, a velocity, an acceleration, a heading, a brake status, a vehicle size, at least one vehicle event flag, a path history, a path prediction, a steering-wheel angle, a timestamp, a positional accuracy, a transmission state, an identifier of the first vehicle 602, or exterior light states of the first vehicle 602. In such a configuration, the first vehicle 602 may generate (628), at 710, the at least one safety message 642 to include the first-vehicle information of the first vehicle 602.

The at least one safety message 642 may include one message with both the first-vehicle information and the second-vehicle information 630. In such a configuration, the second-vehicle information 630 may be relative to the first-vehicle information. Alternatively, each safety message 642 may include absolute vehicle information associated with just one vehicle.

In one configuration, at 706, the first vehicle 602 may determine (624), through sensors of the first vehicle 602, third-vehicle information 632 associated with a third vehicle 606. In addition, at 708, the first vehicle 602 may determine (626) whether to include the third-vehicle information 632 in the generated at least one safety message 642. The third-vehicle information 632 may include at least one of a position, a velocity, an acceleration, a heading, a brake status, a vehicle size, a path history, a path prediction, or exterior light states of the third vehicle 606.

In one configuration, the determined second-vehicle information 630 is a first set of second-vehicle information. In such a configuration, the first vehicle 602 may receive, from a third vehicle 612, a second set of second-vehicle information 690/688 of the second vehicle 604. The second set of second-vehicle information 690/688 may include at least one of a position, a velocity, an acceleration, a heading, a brake status, a vehicle size, a path history, a path prediction, or exterior light states of the second vehicle. The first vehicle 602 may combine the determined first set of second-vehicle information 630 with the received second set of second-vehicle information 690/688. Further, the first vehicle 602 may control the first vehicle 602 based on the combined determined first set of second-vehicle information 630 and the received second set of second-vehicle information 690/688.

In one configuration, each of the at least one safety message 642 is transmitted signed with a digital certificate of the first vehicle 602. In one configuration, the at least one safety message 642 includes one message including information associated with a plurality of vehicles. The one message is signed with one digital certificate of the first vehicle 602. In one configuration, the plurality of vehicles includes the first vehicle 602 and the second vehicle 604. In one configuration, each of the at least one safety message 642 is associated with information of only one vehicle, and each of the at least one safety message 642 is signed with a different digital certificate than the digital certificate used by the first vehicle 602.

Figure 8:
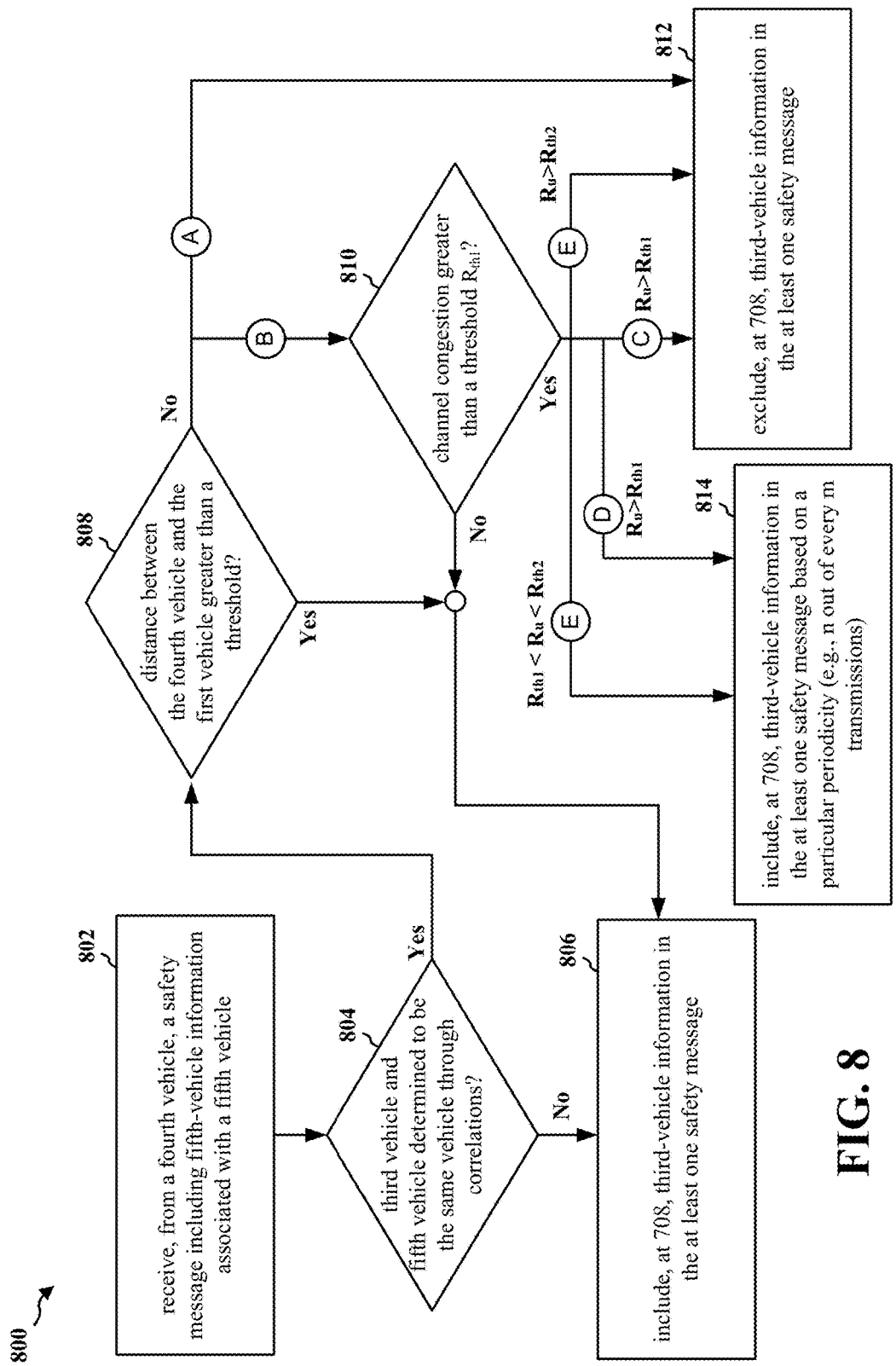
FIG. 8 is a flowchart illustrating a second set of methods of V2V wireless communication.

Referring again to 708 of FIG. 7, how the first vehicle 602 may determine (626) whether to include (or exclude) the third-vehicle information 632 in the generated at least one safety message 642 is discussed further with respect to FIG. 8.

FIG. 8 is a flowchart 800 illustrating a second set of methods of V2V wireless communication. At 802, the first vehicle 602 receives, from a fourth vehicle 608, a safety message 640 including fifth-vehicle information 634 or 636 associated with a fifth vehicle 606 or 610. At 804, the first vehicle 602 determines whether the third vehicle 606 is the fifth vehicle 606 or 610 based on correlating the third-vehicle information 632 with the fifth-vehicle information 634 or 636. The first vehicle 602 may perform the correlation by comparing each of the position, velocity, acceleration, heading, brake status, vehicle size, path history, path prediction, and/or exterior light states in each of the third-vehicle information 632 and the fifth-vehicle information 634 or 636. Assume the fifth vehicle is 610 and the fifth-vehicle information is 636. In such a situation, the third-vehicle information 632 and the fifth-vehicle information 636 should be determined to be uncorrelated, as the information is associated with different vehicles. At 806, the first vehicle 602 then generates (628) the at least one safety message 642 to include the third-vehicle information 632 when the third vehicle 606 is determined to be different than the fifth vehicle 610 based on the correlation.

However, assume the fifth vehicle is 606 and the fifth-vehicle information is 634. In such a situation, the third-vehicle information 632 and the fifth-vehicle information 636 may be determined to be correlated, as the information is associated with the same vehicle. At 808, the first vehicle 602 determines a distance between the fourth vehicle 608 and the first vehicle 602 when the third vehicle 606 and the fifth vehicle 606 are determined to be a same vehicle 606 based on the correlation. The first vehicle 602 may determine a distance between the fourth vehicle 608 and the first vehicle 602 by determining a signal strength of a transmission including the received safety message from the fourth vehicle 608. Specifically, the first vehicle 602 may determine a signal to noise ratio (SNR), a signal to interference plus noise ratio (SINR), a reference signal received power (RSRP), or a reference signal received quality (RSRQ) in association with the received transmission including the safety message from the fourth vehicle 608. When the distance between the fourth vehicle 608 and the first vehicle 602 is determined to be greater than a threshold distance 660, then at 806, the first vehicle 602 generates (628) the at least one safety message 642 to include the third-vehicle information 632. However, when the distance between the fourth vehicle 608 and the first vehicle 602 is determined to be less than a threshold distance 660, then following flow A at 812, the first vehicle 602 may exclude the third-vehicle information 632 from the at least one safety message 642.

Alternatively, following flow B at 810, the first vehicle 602 may determine whether a communication channel congestion $R_u$ is greater than a communication channel congestion threshold $R_{th1}$. The first vehicle 602 may determine a communication channel congestion by listening to the communication channel resources to determine a percentage of the communication channel resources that are being utilized. If the communication channel congestion $R_u$ is determined to be less than the threshold $R_{th1}$, then at 806, the first vehicle 602 generates (628) the at least one safety message 642 to include the third-vehicle information 632.

If the communication channel congestion $R_u$ is determined to be greater than the threshold $R_{th1}$, flows C, D, or E are possible based on different configurations. Following flow C, at 812, the first vehicle 602 may exclude the third-vehicle information 632 from the at least one safety message 642. Following flow D, at 814, the first vehicle 602 may determine a periodicity for including the third-vehicle information 632 in the at least one safety message 642 and may include the third-vehicle information 632 in the at least one safety message 642 based on the determined periodicity. Following flow E, as discussed supra in relation to FIG. 6, 814 may be performed when $R_{th1} < R_u < R_{th2}$, and 812 may be performed when $R_u > R_{th2}$, where $R_{th2} > R_{th1}$.

Figure 9:
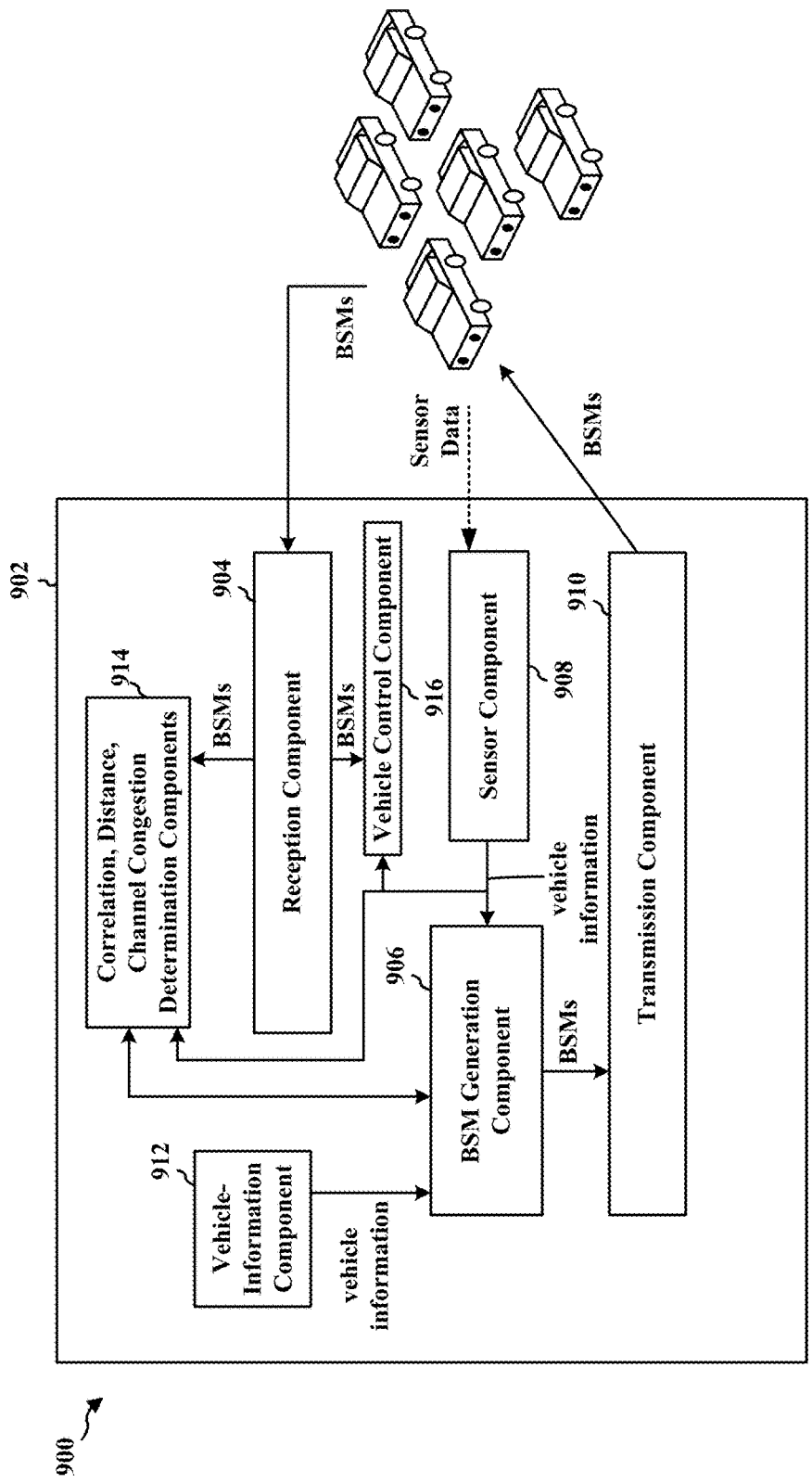
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE/vehicle. The apparatus may be a first vehicle. The first vehicle includes a sensor component 908 that is configured to determine, through sensors of the first vehicle, second-vehicle information associated with a second vehicle. The sensor component 908 is configured to provide the sensed vehicle information to a BSM generation component 906. The first vehicle further includes the BSM generation component 906 that is configured to generate at least one safety message to include the determined second-vehicle information of the second vehicle. The first vehicle further includes a transmission component 910 that is configured to transmit the at least one safety message upon receiving the at least one safety message from the BSM generation component 906.

In one configuration, the second-vehicle information includes at least one of a position, a velocity, an acceleration, a heading, a brake status, a vehicle size, a path history, a path prediction, or exterior light states of the second vehicle. In one configuration, a vehicle-information component 912 may be configured to determine first-vehicle information associated with the first vehicle including at least one of a position, a velocity, an acceleration, a heading, a brake status, a vehicle size, at least one vehicle event flag, a path history, a path prediction, a steering-wheel angle, a time-stamp, a positional accuracy, a transmission state, an identifier of the first vehicle, or exterior light states of the first vehicle. The vehicle-information component 912 may be configured to provide the determined vehicle information to the BSM generation component 906 so that the BSM generation component 906 may generate the at least one safety message to include the first-vehicle information of the first vehicle. In one configuration, the at least one safety message includes one message with both the first-vehicle information and the second-vehicle information, and the second-vehicle information is relative to the first-vehicle information.

In one configuration, the sensor component 908 may be configured to determine, through sensors of the first vehicle, third-vehicle information associated with a third vehicle. The sensor component 908 may be configured to provide the third-vehicle information to the BSM generation component 906. The BSM generation component 906 may be configured to determine whether to include the third-vehicle information in the generated at least one safety message. In one configuration, the third-vehicle information includes at least one of a position, a velocity, an acceleration, a heading, a brake status, a vehicle size, a path history, a path prediction, or exterior light states of the third vehicle. In one configuration, a reception component 904 may be configured to receive, from a fourth vehicle, a safety message including fifth-vehicle information associated with a fifth vehicle. The reception component 904 may be configured to provide the received safety message to a set of components including a correlation determination component, a distance determination component, and a channel congestion component, collectively referred to as 914. The correlation, distance, and channel congestion determination component set 914 may be configured to determine whether the third vehicle is the fifth vehicle based on correlating the third-vehicle information with the fifth-vehicle information. In such a configuration, the BSM generation component 906 may be configured to generate the at least one safety message to include the third-vehicle information when the third vehicle is determined to be different than the fifth vehicle based on the correlation.

In one configuration, the correlation, distance, and channel congestion determination component set 914 may be configured to determine whether the third vehicle is the fifth vehicle based on correlating the third-vehicle information with the fifth-vehicle information. In addition, the correlation, distance, and channel congestion determination component set 914 may be configured to determine a distance between the fourth vehicle and the first vehicle when the third vehicle and the fifth vehicle are determined to be a same vehicle based on the correlation. In such a configuration, the BSM generation component 906 may be configured to generate the at least one safety message to include the third-vehicle information when the distance between the fourth vehicle and the first vehicle is determined to be greater than a threshold distance.

In one configuration, the BSM generation component 906 may be configured to generate the at least one safety message to exclude the third-vehicle information when the third vehicle and the fifth vehicle are determined to be a same vehicle based on the correlation and the distance between the fourth vehicle and the first vehicle is less than the threshold distance.

In one configuration, the correlation, distance, and channel congestion determination component set 914 may be configured to determine whether a communication channel congestion is greater than a threshold. In such a configuration, the BSM generation component 906 may be configured to generate the at least one safety message to include the third-vehicle information when the communication channel congestion is less than the threshold.

In one configuration, the BSM generation component 906 may be configured to generate the at least one safety message to exclude the third-vehicle information when the third vehicle and the fifth vehicle are determined to be a same vehicle based on the correlation, the communication channel congestion is greater than the threshold, and the distance between the fourth vehicle and the first vehicle is less than a threshold distance.

In one configuration, the BSM generation component 906 may be configured to determine a periodicity for including the third-vehicle information in the at least one safety message when the communication channel congestion is greater than the threshold. In such a configuration, the BSM generation component 906 may be configured to generate the at least one safety message to include the third-vehicle information based on the determined periodicity when the third vehicle and the fifth vehicle are determined to be a same vehicle based on the correlation, the communication channel congestion is greater than the threshold, and the distance between the fourth vehicle and the first vehicle is less than a threshold distance.

In one configuration, the determined second-vehicle information is a first set of second-vehicle information. In such a configuration, the reception component 904 may be configured to receive, from a third vehicle, a second set of second-vehicle information of the second vehicle. The second set of second-vehicle information includes at least one of a position, a velocity, an acceleration, a heading, a brake status, a vehicle size, a path history, a path prediction, or exterior light states of the second vehicle. In one configuration, a vehicle control component 916 may be configured to combine the determined first set of second-vehicle information with the received second set of second-vehicle information, and to control the first vehicle based on the combined determined first set of second-vehicle information and the received second set of second-vehicle information.

In one configuration, the transmission component 910 may be configured to transmit each of the at least one safety message signed with a digital certificate of the first vehicle. In one configuration, the at least one safety message includes one message including information associated with a plurality of vehicles, and the one message is signed with one digital certificate of the first vehicle. In one configuration, the plurality of vehicles includes the first vehicle and the second vehicle. In one configuration, each of the at least one safety message is associated with information of only one vehicle, and each of the at least one safety message is signed with a different digital certificate than the digital certificate used by the first vehicle.

The apparatus may include additional components that perform each of the blocks of the algorithm in the aforementioned flowcharts of FIGS. 7, 8. As such, each block in the aforementioned flowcharts of FIGS. 7, 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
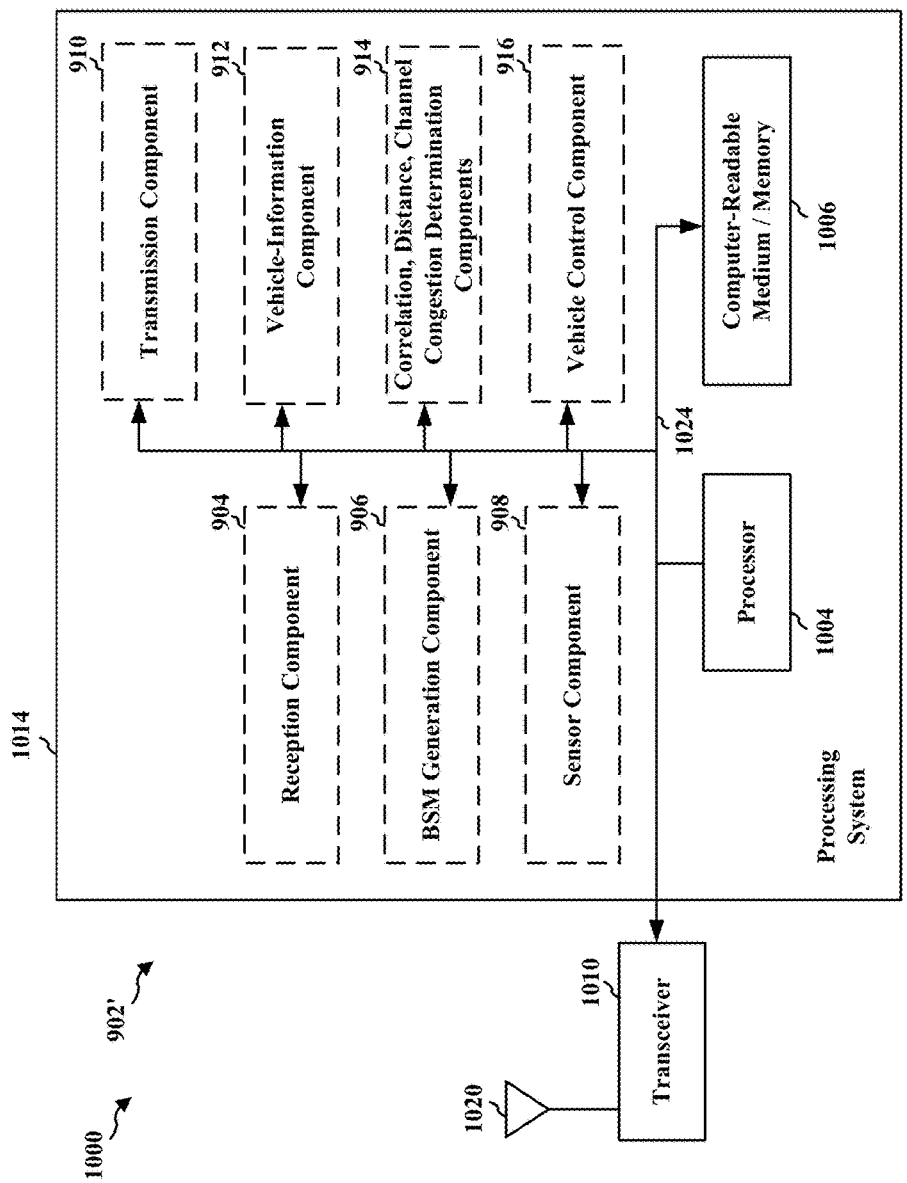
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, 916. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for determining, through sensors of a first vehicle, second-vehicle information associated with a second vehicle. The apparatus further includes means for generating at least one safety message to include the determined second-vehicle information of the second vehicle. The apparatus further includes means for transmitting the at least one safety message.

In one configuration, the second-vehicle information comprises at least one of a position, a velocity, an acceleration, a heading, a brake status, a vehicle size, a path history, a path prediction, or exterior light states of the second vehicle.

In one configuration, the apparatus may further include means for determining first-vehicle information associated with the first vehicle including at least one of a position, a velocity, an acceleration, a heading, a brake status, a vehicle size, at least one vehicle event flag, a path history, a path prediction, a steering-wheel angle, a timestamp, a positional accuracy, a transmission state, an identifier of the first vehicle, or exterior light states of the first vehicle. In such a configuration, the at least one safety message may be generated to include the first-vehicle information of the first vehicle. In one configuration, the at least one safety message may include one message with both the first-vehicle information and the second-vehicle information, and the second-vehicle information may be relative to the first-vehicle information.

In one configuration, the apparatus may further include means for determining, through sensors of the first vehicle, third-vehicle information associated with a third vehicle. In addition, the apparatus may further include means for determining whether to include the third-vehicle information in the generated at least one safety message. In one configuration, the third-vehicle information includes at least one of a position, a velocity, an acceleration, a heading, a brake status, a vehicle size, a path history, a path prediction, or exterior light states of the third vehicle. In one configuration, the apparatus may further include means for receiving, from a fourth vehicle, a safety message including fifth-vehicle information associated with a fifth vehicle. In addition, the apparatus may further include means for determining whether the third vehicle is the fifth vehicle based on correlating the third-vehicle information with the fifth-vehicle information. In such a configuration, the at least one safety message may be generated to include the third-vehicle information when the third vehicle is determined to be different than the fifth vehicle based on the correlation.

In one configuration, the apparatus may further include means for determining whether the third vehicle is the fifth vehicle based on correlating the third-vehicle information with the fifth-vehicle information. In addition, the apparatus may further include means for determining a distance between the fourth vehicle and the first vehicle when the third vehicle and the fifth vehicle are determined to be a same vehicle based on the correlation. In such a configuration, the at least one safety message may be generated to include the third-vehicle information when the distance between the fourth vehicle and the first vehicle is determined to be greater than a threshold distance. In one configuration, the at least one safety message may be generated to exclude the third-vehicle information when the third vehicle and the fifth vehicle are determined to be a same vehicle based on the correlation and the distance between the fourth vehicle and the first vehicle is less than the threshold distance. In one configuration, the apparatus may further include means for determining whether a communication channel congestion is greater than a threshold. In such a configuration, the at least one safety message may be generated to include the third-vehicle information when the communication channel congestion is less than the threshold. In one configuration, the at least one safety message may be generated to exclude the third-vehicle information when the third vehicle and the fifth vehicle are determined to be a same vehicle based on the correlation, the communication channel congestion is greater than the threshold, and the distance between the fourth vehicle and the first vehicle is less than a threshold distance. In one configuration, the apparatus may further include means for determining a periodicity for including the third-vehicle information in the at least one safety message when the communication channel congestion is greater than the threshold. In such a configuration, the at least one safety message may be generated to include the third-vehicle information based on the determined periodicity when the third vehicle and the fifth vehicle are determined to be a same vehicle based on the correlation, the communication channel congestion is greater than the threshold, and the distance between the fourth vehicle and the first vehicle is less than a threshold distance.

In one configuration, the determined second-vehicle information is a first set of second-vehicle information. In such a configuration, the apparatus may further include means for receiving, from a third vehicle, a second set of second-vehicle information of the second vehicle. The second set of second-vehicle information may include at least one of a position, a velocity, an acceleration, a heading, a brake status, a vehicle size, a path history, a path prediction, or exterior light states of the second vehicle. In addition, the apparatus may further include means for combining the determined first set of second-vehicle information with the received second set of second-vehicle information. Furthermore, the apparatus may further include means for controlling the first vehicle based on the combined determined first set of second-vehicle information and the received second set of second-vehicle information.

In one configuration, each of the at least one safety message may be transmitted signed with a digital certificate of the first vehicle. In one configuration, the at least one safety message may include one message including information associated with a plurality of vehicles. The one message may be signed with one digital certificate of the first vehicle. In one configuration, the plurality of vehicles may include the first vehicle and the second vehicle. In one configuration, each of the at least one safety message may be associated with information of only one vehicle, and each of the at least one safety message may be signed with a different digital certificate than the digital certificate used by the first vehicle.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

As discussed supra, an apparatus is provided that determines, through sensors of a first vehicle, second-vehicle information associated with a second vehicle. In addition, the apparatus generates at least one safety message to include the determined second-vehicle information of the second vehicle. Further, the apparatus transmits the at least one safety message. The apparatus may determine whether to include or to exclude the sensed vehicle information from a BSM (or whether to transmit or to refrain from transmitting such sensed vehicle information in a BSM) based on a variety of factors, including whether the sensed vehicle information correlates with vehicle information received from another vehicle in a BSM, a distance to the vehicle from which the same (correlated) vehicle information is received, and a communications channel congestion in comparison to one or more communications channel congestion thresholds. The apparatus improves the performance/benefit of V2V communications technology by transmitting BSMs for other vehicles, including non-V2V vehicles without such V2V communications technology. Accordingly V2V vehicles will be able to better assess the traffic situation.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first vehicle, comprising:
    determining, through sensors of the first vehicle, second-vehicle information associated with a second vehicle and third-vehicle information associated with a third vehicle;
    generating at least one safety message to include at least the determined second-vehicle information of the second vehicle;
    determining whether to include the third-vehicle information in the at least one safety message based on correlating the third-vehicle information with other vehicle information; and
    transmitting the at least one safety message.

2. The method of claim 1, wherein the second-vehicle information comprises at least one of a position, a velocity, an acceleration, a heading, a brake status, a vehicle size, a path history, a path prediction, or exterior light states of the second vehicle.

3. The method of claim 1, further comprising determining first-vehicle information associated with the first vehicle including at least one of a position, a velocity, an acceleration, a heading, a brake status, a vehicle size, at least one vehicle event flag, a path history, a path prediction, a steering-wheel angle, a timestamp, a positional accuracy, a transmission state, an identifier of the first vehicle, or exterior light states of the first vehicle, wherein the at least one safety message is generated to include the first-vehicle information of the first vehicle.

4. The method of claim 3, wherein the at least one safety message comprises one message with both the first-vehicle information and the second-vehicle information, and the second-vehicle information is relative to the first-vehicle information.

5. The method of claim 1, wherein the third-vehicle information comprises at least one of a position, a velocity, an acceleration, a heading, a brake status, a vehicle size, a path history, a path prediction, or exterior light states of the third vehicle.

6. The method of claim 5, further comprising:
receiving, from a fourth vehicle, a safety message including fifth-vehicle information associated with a fifth vehicle;
determining whether the third vehicle is the fifth vehicle based on correlating the third-vehicle information with the fifth-vehicle information,
wherein the at least one safety message is generated to include the third-vehicle information when the third vehicle is determined to be different than the fifth vehicle based on the correlation.

7. The method of claim 6, further comprising:
determining a distance between the fourth vehicle and the first vehicle when the third vehicle and the fifth vehicle are determined to be a same vehicle based on the correlation,
wherein the at least one safety message is generated to include the third-vehicle information when the distance between the fourth vehicle and the first vehicle is determined to be greater than a threshold distance.

8. The method of claim 7, wherein the at least one safety message is generated to exclude the third-vehicle information when the third vehicle and the fifth vehicle are determined to be a same vehicle based on the correlation and the distance between the fourth vehicle and the first vehicle is less than the threshold distance.

9. The method of claim 7, further comprising:
determining whether a communication channel congestion is greater than a threshold,
wherein the at least one safety message is generated to include the third-vehicle information when the communication channel congestion is less than the threshold.

10. The method of claim 9, wherein the at least one safety message is generated to exclude the third-vehicle information when the third vehicle and the fifth vehicle are determined to be a same vehicle based on the correlation, the communication channel congestion is greater than the threshold, and the distance between the fourth vehicle and the first vehicle is less than the threshold distance.

11. The method of claim 9, further comprising determining a periodicity for including the third-vehicle information in the at least one safety message when the communication channel congestion is greater than the threshold,
wherein the at least one safety message is generated to include the third-vehicle information based on the determined periodicity when the third vehicle and the fifth vehicle are determined to be a same vehicle based on the correlation, the communication channel congestion is greater than the threshold, and the distance between the fourth vehicle and the first vehicle is less than the threshold distance.

12. The method of claim 1, wherein the determined second-vehicle information is a first set of second-vehicle information, the method further comprising:
receiving, from a third vehicle, a second set of second-vehicle information of the second vehicle, the second set of second-vehicle information including at least one of a position, a velocity, an acceleration, a heading, a brake status, a vehicle size, a path history, a path prediction, or exterior light states of the second vehicle;
combining the determined first set of second-vehicle information with the received second set of second-vehicle information; and
controlling the first vehicle based on the combined determined first set of second-vehicle information and the received second set of second-vehicle information.

13. The method of claim 1, wherein each of the at least one safety message is transmitted signed with a digital certificate of the first vehicle.

14. The method of claim 13, wherein the at least one safety message comprises one message including information associated with a plurality of vehicles, the one message being signed with one digital certificate of the first vehicle.

15. The method of claim 14, wherein the plurality of vehicles includes the first vehicle and the second vehicle.

16. The method of claim 13, wherein each of the at least one safety message is associated with information of only one vehicle, and each of the at least one safety message is signed with a different digital certificate than the digital certificate used by the first vehicle.

17. An apparatus for wireless communication, comprising:
a memory; and
at least one processor coupled to the memory and configured to:
determine, through sensors of a first vehicle, second-vehicle information associated with a second vehicle and third-vehicle information associated with a third vehicle;
generate at least one safety message to include at least the determined second-vehicle information of the second vehicle;
determine whether to include the third-vehicle information in the at least one safety message based on correlating the third-vehicle information with other vehicle information; and
transmit the at least one safety message.

18. The apparatus of claim 17, wherein the second-vehicle information comprises at least one of a position, a velocity, an acceleration, a heading, a brake status, a vehicle size, a path history, a path prediction, or exterior light states of the second vehicle.

19. The apparatus of claim 17, wherein the third-vehicle information comprises at least one of a position, a velocity, an acceleration, a heading, a brake status, a vehicle size, a path history, a path prediction, or exterior light states of the third vehicle.

20. The apparatus of claim 19, wherein the at least one processor is further configured to:
receive, from a fourth vehicle, a safety message including fifth-vehicle information associated with a fifth vehicle;

determine whether the third vehicle is the fifth vehicle based on correlating the third-vehicle information with the fifth-vehicle information, wherein the at least one safety message is generated to include the third-vehicle information when the third vehicle is determined to be different than the fifth vehicle based on the correlation.

21. The apparatus of claim 20, wherein the at least one processor is further configured to:

determine whether the third vehicle is the fifth vehicle based on correlating the third-vehicle information with the fifth-vehicle information; and determine a distance between the fourth vehicle and the first vehicle when the third vehicle and the fifth vehicle are determined to be a same vehicle based on the correlation, wherein the at least one safety message is generated to include the third-vehicle information when the distance between the fourth vehicle and the first vehicle is determined to be greater than a threshold distance.

22. The apparatus of claim 21, wherein the at least one safety message is generated to exclude the third-vehicle information when the third vehicle and the fifth vehicle are determined to be a same vehicle based on the correlation and the distance between the fourth vehicle and the first vehicle is less than the threshold distance.

23. The apparatus of claim 21, wherein the at least one processor is further configured to determine whether a communication channel congestion is greater than a threshold, wherein the at least one safety message is generated to include the third-vehicle information when the communication channel congestion is less than the threshold.

24. The apparatus of claim 23, wherein the at least one safety message is generated to exclude the third-vehicle information when the third vehicle and the fifth vehicle are determined to be a same vehicle based on the correlation, the communication channel congestion is greater than the threshold, and the distance between the fourth vehicle and the first vehicle is less than the threshold distance.

25. The apparatus of claim 23, wherein the at least one processor is further configured to determine a periodicity for including the third-vehicle information in the at least one safety message when the communication channel congestion is greater than the threshold, wherein the at least one safety message is generated to include the third-vehicle information based on the determined periodicity when the third vehicle and the fifth vehicle are determined to be a same vehicle based on the correlation, the communication channel congestion is greater than the threshold, and the distance between the fourth vehicle and the first vehicle is less than the threshold distance.

26. The apparatus of claim 17, wherein the determined second-vehicle information is a first set of second-vehicle information, the at least one processor being further configured to:

receive, from a third vehicle, a second set of second-vehicle information of the second vehicle, the second set of second-vehicle information including at least one of a position, a velocity, an acceleration, a heading, a brake status, a vehicle size, a path history, a path prediction, or exterior light states of the second vehicle;

combine the determined first set of second-vehicle information with the received second set of second-vehicle information; and control the first vehicle based on the combined determined first set of second-vehicle information and the received second set of second-vehicle information.

27. An apparatus for wireless communication, comprising:

means for determining, through sensors of a first vehicle, second-vehicle information associated with a second vehicle and third-vehicle information associated with a third vehicle;

means for generating at least one safety message to include at least the determined second-vehicle information of the second vehicle;

determining whether to include the third-vehicle information in the at least one safety message based on correlating the third-vehicle information with other vehicle information; and means for transmitting the at least one safety message.

28. A non-transitory computer-readable medium storing computer executable code, which when executed by a processor, causes the processor to perform the following operations:

determine, through sensors of a first vehicle, second-vehicle information associated with a second vehicle and third-vehicle information associated with a third vehicle;

generate at least one safety message to include at least the determined second-vehicle information of the second vehicle;

determining whether to include the third-vehicle information in the at least one safety message based on correlating the third-vehicle information with other vehicle information; and transmit the at least one safety message.

* * * * *